Feb. 26, 1952     A. V. NEAL     2,587,199
RIP GAUGE ASSEMBLY FOR RIP SAW
Filed Jan. 23, 1951     2 SHEETS—SHEET 1
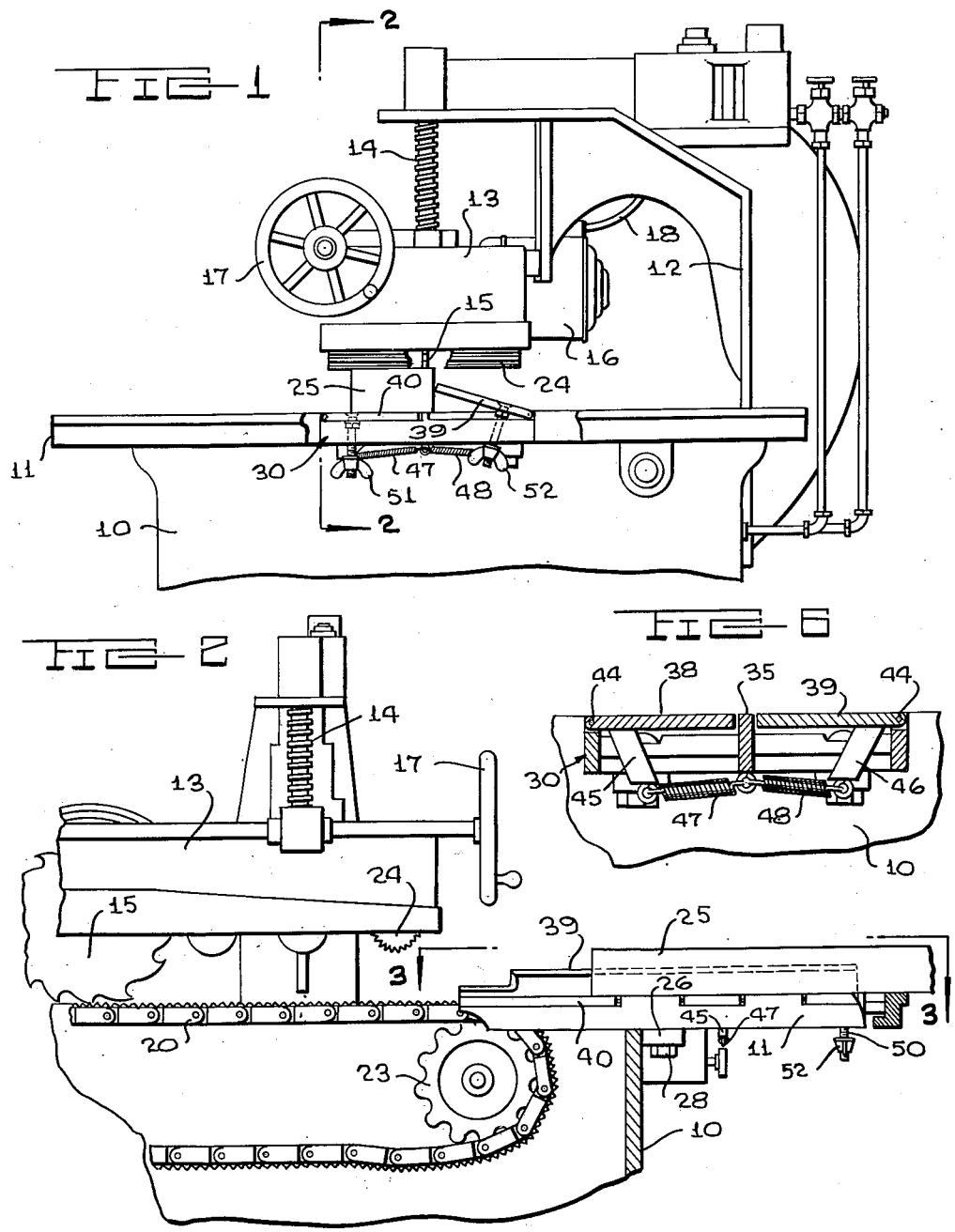
INVENTOR.
ALBERT V. NEAL
BY
McMorrow, Berman + Davidson
ATTORNEYS Feb. 26, 1952          A. V. NEAL          2,587,199
RIP GAUGE ASSEMBLY FOR RIP SAW
Filed Jan. 23, 1951          2 SHEETS—SHEET 2
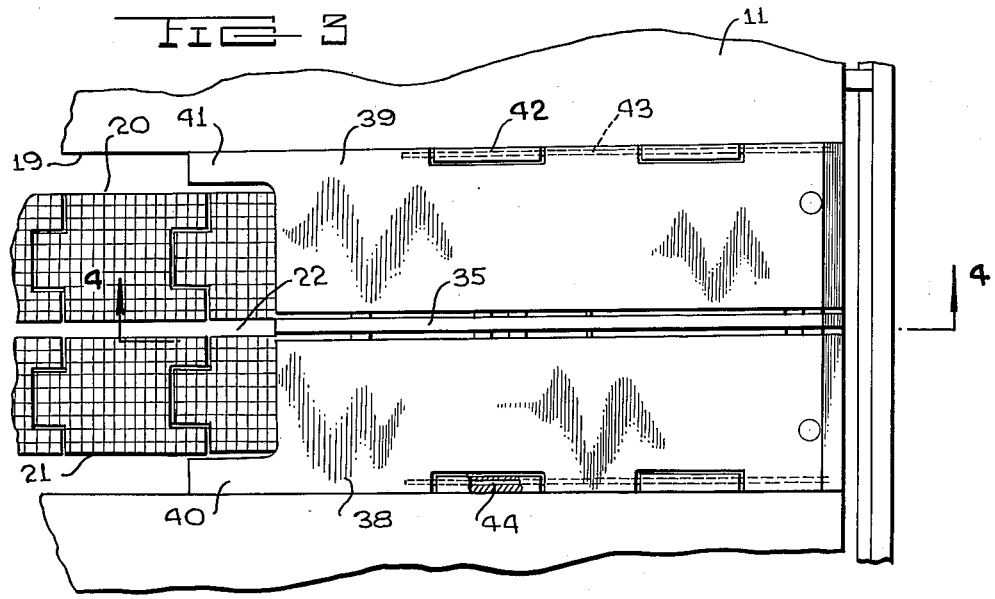
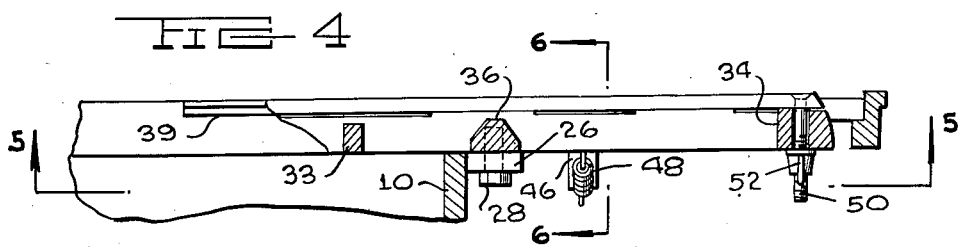
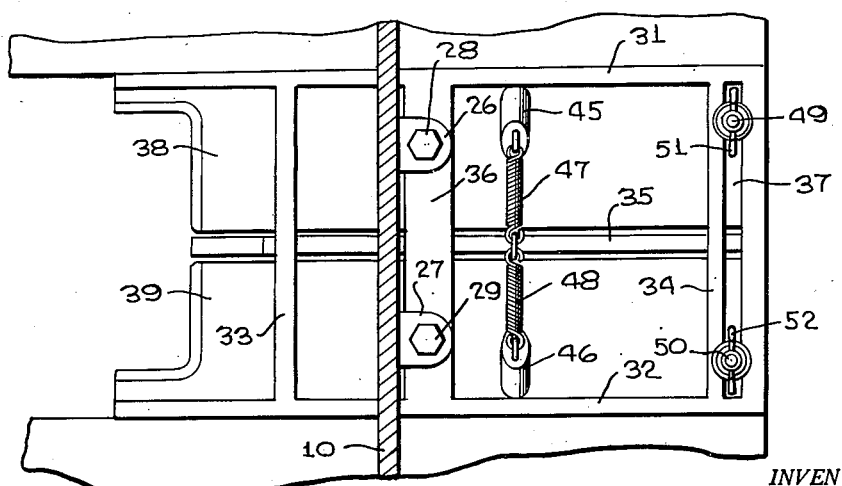
INVENTOR.
ALBERT V. NEAL
BY
McMorrow, Berman & Davidson
ATTORNEYS Patented Feb. 26, 1952

2,587,199

UNITED STATES PATENT OFFICE 2,587,199

RIP GAUGE ASSEMBLY FOR RIP SAW

Albert V. Neal, High Point, N. C.

Application January 23, 1951, Serial No. 207,350

5 Claims. (Cl. 143—168)

This invention relates to rip gauge assemblies for rip saws and more particularly to a double acting gauge assembly for use in trimming the edges of flat work pieces of lumber.

It is among the objects of the invention to provide an improved rip gauge assembly which can be mounted in an opening in an existing saw table and provides alternatively usable gauge surfaces disposed at respectively opposite sides of the saw; in which the means providing the gauge surfaces are resiliently urged to operative position and either one is moved to inoperative position by placing the work piece thereon; which may be applied to various types of saws having tables provided with suitable openings to receive the gauge assembly without modification of the saw construction; and which is simple and durable in construction, economical to manufacture, easy to install and use, and positive and effective in operation.

Other objects and advantages will become apparent from a consideration of the following description and the appended claims in conjunction with the accompanying drawings wherein:

Figure 1 is a fragmentary end elevational view of a rip saw showing a rip gauge assembly illustrative of the invention operatively mounted on the saw;

Figure 2 is a fragmentary cross sectional view on the line 2—2 of Figure 1;

Figure 3 is a fragmentary top plan view of the saw table and rip gauge assembly, portions being broken away and shown in cross section to better illustrate the construction thereof;

Figure 4 is a cross sectional view on the line 4—4 of Figure 3;

Figure 5 is a cross sectional view on the line 5—5 of Figure 4 looking in the direction of the arrows; and Figure 6 is a cross sectional view on the line 6—6 of Figure 4.

With continued reference to the drawings, the rip saw illustrated comprises a hollow base 10, a table 11 supported on the base and having a flat and substantially horizontal top surface, a bracket structure 12 secured to the base at one side of the table and extending over the table above the same, a saw head 13 adjustably supported from the bracket structure 12 by screw shafts 14, a circular saw blade 15 journaled in the head 13 and a motor 16 carried by the head and drivingly connected to the blade 15. The saw head is adjustably moved toward and away from the top surface of the table by means including the handwheel 17 and electric energy is supplied to the motor 16 through a suitable flexible extension cord 18.

The table 11 is provided with a transversely extending opening 19 extending between two opposite sides of the table and having spaced apart and substantially parallel side edges. Two flexible belts 20 and 21, formed of pivotally interconnected plates are mounted in the opening 19 and disposed at respectively opposite sides of the saw blade 15, an opening 22 of a width sufficient to receive the saw blade being provided between the adjacent edges of the belts. These belts are mounted on sprockets, as indicated at 23 in Figure 2, so that the upper flights of the belts are substantially flush with the top surface of the table. The sprockets are driven by suitable means, such as an electric motor, so that the top portions or upper flights of the belts are moved continuously past the saw blade in the work piece feeding direction. Suitable rollers 24 are carried by the head 13 and project below the bottom surface of the head. These rollers are disposed transversely of the belts 20 and 21 so that a work piece, as indicated at 25, fed past the saw blade is gripped between these rollers and the top portion of one of the belts or the top portions of both of the belts to positively feed the work piece past the saw and maintain the work piece in proper position relative to the saw blade.

The belt does not extend to the side edges of the table to which the opening 19 extends and a rectangular flat plate, not illustrated, is disposed in the end portion of the opening 19 between the edge of the table at the feed side of the saw and the adjacent ends of the belts 20 and 21.

This plate is secured in position in the opening by the apertured lugs 26 and 27 projecting outwardly from the base 10 at the upper edge of the base and toward the feed side of the table and bolts 28 and 29 extending through the apertures in the lugs 27 and 28 and threaded into bolt holes provided in the under surface of the plate at locations spaced apart transversely of the plate.

While the saw involves much additional structure and detail, such saws are old and well known to the art, and the above description is considered sufficient to provide a complete understanding of the improved rip gauge constituting the subject matter of the present invention. A saw of the character indicated is manufactured by the Mattison Machine Works of Rockford, Illinois, and sold to the trade under the designation of "Mattison 202."

Another saw of this character is manufactured by the G. M. Diehl Machine Works of Wabash, Indiana, and sold to the trade under the designation "Diehl-55" or "Diehl-75."

The rip gauge assembly of the present invention is generally designated at 30 and includes a rectangular frame having a width substantially equal to the width of the opening 19 in the saw table and a length substantially equal to the length of this opening from the edge of the table at the feed side thereof to the adjacent ends of the belts 20 and 21. This frame includes two side members 31 and 32 disposed in spaced apart and parallel relationship to each other, two end members 33 and 34 extending between the side members and disposed substantially perpendicular thereto, a longitudinal center member 35 extending between the end members substantially midway between and parallel to the side members 31 and 32 and a transverse intermediate member 36 extending between the side members intermediate the length of the latter and between the end members 33 and 34.

The end member 34 disposed at the end of the frame adjacent the feed edge of the table is heavier than the end member 33 and is provided with a longitudinally extending slot 37 extending from the top to the bottom side of this member substantially perpendicular to the plane of the top surface of the frame when the frame is operatively mounted in the saw table. The lighter end member 33 is disposed inwardly of the adjacent ends of the side members so that the side members 31 and 32 overlap the adjacent ends of the belts 20 and 21, as is particularly shown in Figure 3. The intermediate transverse member 36 is also heavier than the end member 33 and is provided at locations spaced apart longitudinally thereof with screw threaded bolt holes which receive the bolts 28 and 29 for securing the frame to the saw base 10 in the opening 19 of the saw table.

Two leaves 38 and 39 of rectangular shape are disposed on the top side of the frame and at respectively opposite sides of the frame center member 35. Each of these leaves has a length substantially equal to the length of the side members of the frame and a width substantially equal to the distance from the outer side of each side member of the frame to the adjacent side of the frame center member 35 or, in other words, substantially equal to one half of the width of the frame.

The leaves 38 and 39 are recessed, at their ends adjacent the belts 20 and 21, as is particularly illustrated in Figure 3, to provide extensions 40 and 41 at the outer sides of the leaves overlapping the adjacent end portions of the corresponding belts 20 and 21.

The leaves are supported by the frame so that their upper surfaces are substantially flush with the top surface of the saw table 11 and the top surfaces of the belts 20 and 21 and are hingedly connected at their outer longitudinal edges to the corresponding frame side members 31 and 32 at the upper edges of these side members.

In the arrangement illustrated, each side member is provided on its top edge with a pair of upwardly extending, partly cylindrical projections 42 spaced apart longitudinally of the corresponding side member and provided with bores extending longitudinally therethrough, the bores of the two projections on each side member being longitudinally aligned. The leaves 38 and 39 are notched at their outer edges to receive the projections 42 and the portions of the leaves at the opposite sides of these notches are provided with longitudinally aligned bores, as indicated at 43. Hinge pins, as indicated at 44, extend through the aligned bores in the frame projections 42 and in the portions of the leaves at the opposite ends of the projection receiving notches in the latter and hingedly connect the leaves to the frame side members so that the edges of the leaves adjacent the frame center member 35 can swing upwardly and downwardly toward and away from the top edge of the center member and above the top surface of the table.

Legs 45 and 46 are secured each at one end to the leaves 38 and 39 at the under sides and near the outer edges of the leaves and extend downwardly from the leaves when the rip gauge is operatively mounted on a saw table.

Coiled tension springs 47 and 48 are connected between the distal ends of the legs 45 and 46 respectively and the frame center member 35 and resiliently urge the inner edges of the leaves adjacent the center member upwardly above the top surface of the saw table. Bolts 49 and 50 are secured, each at one end, to the leaves 38 and 39 respectively at the under sides and intermediate the width of the leaves and extend from the leaves through the slot 37 in the frame end member 34. Wing nuts 51 and 52 are threaded onto the bolts 49 and 50 respectively at the under side of the frame end member 34 and provide adjustable means for limiting upward movement of the inner edges of the leaves 38 and 39 by the springs 47 and 48.

When the gauge assembly is operatively mounted in the saw table, both of the leaves 38 and 39 will be forced upwardly by the springs 47 and 48 so that the inner edges of both leaves are above the top surface of the table. The distance between the inner edges of the leaves and the adjacent sides of the saw blade is adjusted by threading the wing nuts 51 and 52 along the bolts 49 and 50 to thereby adjust the angularity of the leaves. With both leaves in their upraised position, as indicated above, when the work piece 25 is placed on one of the leaves, this leaf is forced downwardly to a position in which its top surface is substantially flush with the top surface of the table. The adjacent edge of the work piece may then be brought to bear against the inner edge of the other leaf and the other leaf, still in its upraised position, will serve as a guide or rip gauge for guiding the work piece past the saw to trim the corresponding edge of the work piece.

The work piece may be disposed at either side of the saw, the leaf at that side being depressed, and the other leaf remaining upraised to serve as a guide.

This rip gauge assembly is particularly designed for use in trimming the edges of work pieces to make glue joints and for similar purposes and, when it is desired to use the saw for other purposes, this gauge assembly can be easily removed, the filler plate reinstalled and the rip gauge or fence provided as standard equipment and the saw restored to use.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a saw including a circular saw blade, means supporting and driving said blade, and a saw table having therein a rectangular opening the longitudinal center line of which is disposed substantially in the plane of rotation of the saw blade, and fixed lugs disposed at the under side of said table and within said opening, a rip gauge assembly disposed in said opening and comprising a rectangular frame structure of substantially the same length and breadth as said opening and including side members disposed in spaced apart and substantially parallel relationship, end members disposed one at each end of said frame and joined at their ends to the corresponding side members, a longitudinal center member extending between said end members midway between and substantially parallel to said side members and a transverse intermediate member extending between said side members and disposed between said end members, means connecting said lugs to said intermediate member to secure said frame in said opening, rectangular leaves disposed on said frame one at each side of said center member and each having a length substantially equal to the length of said frame and a width substantially equal to one half the width of said frame, means hingedly connecting said frame side members to said leaves at the adjacent longitudinal edges of the latter, said leaves being supported by said frame substantially flush with the top surface of said table, springs acting between said frame and said leaves resiliently urging the edges of said leaves adjacent said center member away from the latter and above the top surface of said table, and adjustable means connected between said frame and said leaves limiting the movement of said leaves by said springs, either of said leaves being depressed by a work piece positioned thereon to a position in which it is substantially flush with the top surface of said table and the raised edge of the other leaf providing a guide for moving the work piece past the saw blade.

2. In combination with a saw including a circular saw blade, means supporting and driving said blade, and a saw table operatively positioned relative to said saw blade and having therein a rectangular opening extending from one edge of the table to a location between said one edge of the table and said saw blade with its longitudinal center line substantially in the plane of rotation of the saw blade, and a base supporting said table, a rip gauge assembly disposed in the opening in said table and comprising a rectangular frame structure of substantially the same length and breadth as said opening and having a center member extending longitudinally thereof substantially midway between and parallel to its sides, means connecting said frame to said base to secure the rip gauge in said opening in the table, rectangular leaves disposed on said frame one at each side of said center member and extending from one end to the other end of said frame and from said center member to the corresponding sides of the frame, said leaves being supported by said frame substantially flush with the top surface of said table, means hingedly connecting said frame at the sides thereof to said leaves at the adjacent longitudinal edges of the latter, resilient means acting between said frame and said leaves resiliently urging the edges of said leaves adjacent said center member upwardly from the latter and above the top surface of said table, and adjustable means connected between said frame and said leaves limiting the movement of said leaves by said resilient means, either of said leaves being depressible by a work piece positioned thereon to a position substantially flush with the top surface of said table leaving the other leaf in upraised position so that its edge adjacent said center member provides a guide for moving the work piece past the saw blade.

3. In combination with a saw including a circular saw blade, means supporting and driving said blade, and a saw table operatively positioned relative to said saw blade and having therein a rectangulr opening extending from one edge of the table to a location between said one edge of the table and said saw blade with its longitudinal center line substantially in the plane of rotation of the saw blade, and a base supporting said table, a rip gauge assembly disposed in the opening in said table and comprising a rectangular frame structure of substantially the same length and breadth as said opening and having a center member extending longitudinally thereof substantially midway between and parallel to its sides, means connecting said frame to said base to secure the rip gauge in said opening in the table, rectangular leaves disposed on said frame one at each side of said center member and extending from one end to the other end of said frame and from said center member to the corresponding sides of the frame, said leaves being supported by said frame substantially flush with the top surface of said table, means hingedly connecting said frame at the sides thereof to said leaves at the adjacent longitudinal edges of the latter, resilient means acting between said frame and said leaves resiliently urging the edges of said leaves adjacent said center member upwardly from the latter and above the top surface of said table, and adjustable means connected between said frame and said leaves limiting the movement of said leaves by said resilient means, either of said leaves being depressible by a work piece positioned thereon to a position substantially flush with the top surface of said table leaving the other leaf in upraised position so that its edge adjacent said center member provides a guide for moving the work piece past the saw blade, said means connecting said intermediate member to said base comprising apertured lugs projecting outwardly from said base within the opening in said table and bolts extending through the apertures in said lugs and threaded into corresponding bolt holes provided in said intermediate member at locations spaced apart longitudinally of the latter.

4. In combination with a saw including a circular saw blade, means supporting and driving said blade, and a saw table operatively positioned relative to said saw blade and having therein a rectangular opening extending from one edge of the table to a location between said one edge of the table and said saw blade with its longitudinal center line substantially in the plane of rotation of the saw blade, and a base supporting said table, a rip gauge assembly disposed in the opening in said table and comprising a rectangular frame structure of substantially the same length and breadth as said opening and having a center member extending longitudinally thereof substantially midway between and parallel to its sides, means connecting said frame to said base to secure the rip gauge in said opening in the table, rectangular leaves disposed on said frame one at each side of said center member and extending from one end to the other end of said frame and from said center member to the corresponding sides of the frame, said leaves being supported by said frame substantially flush with the top surface of said table, means hingedly connecting said frame at the sides thereof to said leaves at the adjacent longitudinal edges of the latter, resilient means acting between said frame and said leaves resiliently urging the edges of said leaves adjacent said center member upwardly from the latter and above the top surface of said table, and adjustable means connected between said frame and said leaves limiting the movement of said leaves by said resilient means, either of said leaves being depressible by a work piece positioned thereon to a position substantially flush with the top surface of said table leaving the other leaf in upraised position so that its edge adjacent said center member provides a guide for moving the work piece past the saw blade, each of said leaves having a leg secured at one end to the under side thereof and projecting downwardly therefrom and said resilient means comprising tension springs connected respectively between the distal ends of said legs and said frame center member.

5. In combination with a saw including a circular saw blade, means supporting and driving said blade, and a saw table operatively positioned relative to said saw blade and having therein a rectangular opening extending from one edge of the table to a location between said one edge of the table and said saw blade with its longitudinal center line substantially in the plane of rotation of the saw blade, and a base supporting said table, a rip gauge assembly disposed in the opening in said table and comprising a rectangular frame structure of substantially the same length and breadth as said opening and having a center member extending longitudinally thereof substantially midway between and parallel to its sides, means connecting said frame to said base to secure the rip gauge in said opening in the table, rectangular leaves disposed on said frame one at each side of said center member and extending from one end to the other end of said frame and from said center member to the corresponding sides of the frame, said leaves being supported by said frame substantially flush with the top surface of said table, means hingedly connecting said frame at the sides thereof to said leaves at the adjacent longitudinal edges of the latter, resilient means acting between said frame and said leaves resiliently urging the edges of said leaves adjacent said center member upwardly from the latter and above the top surface of said table, and adjustable means connected between said frame and said leaves limiting the movement of said leaves by said resilient means, either of said leaves being depressible by a work piece positioned thereon to a position substantially flush with the top surface of said table leaving the other leaf in upraised position so that its edge adjacent said center member provides a guide for moving the work piece past the saw blade, each of said leaves having a leg secured at one end to the under side thereof and projecting downwardly therefrom and said resilient means comprising tension springs connected respectively between the distal ends of said legs and said frame center member, said frame including an end member having a longitudinally extending slot therein and said adjustable means limiting the movements of said leaves by said resilient means comprising bolts secured one to each of said leaves and extending from said leaves through the slot in said frame end member and nuts threaded onto said bolts at the side of said frame end member remote from said leaves to provide adjustable limit stops for upward movement of said leaves.

ALBERT V. NEAL.

No references cited.